United States Patent [19]

Hilbish

[11] Patent Number: 5,695,302
[45] Date of Patent: Dec. 9, 1997

[54] THRUST SLOT NECK-GUIDED AIR CONVEYOR

[75] Inventor: Brian K. Hilbish, Bedford, Va.

[73] Assignee: Simplimatic Engineering Company, Lynchburg, Va.

[21] Appl. No.: 616,244

[22] Filed: Mar. 15, 1996

[51] Int. Cl.[6] .................................................. B65G 51/03
[52] U.S. Cl. .................................................. 406/88
[58] Field of Search .................................. 406/86, 88

[56] References Cited

U.S. PATENT DOCUMENTS

| 5,437,521 | 8/1995 | Oullette | 406/88 |
| 5,484,237 | 1/1996 | Langenbeck | 406/88 |

FOREIGN PATENT DOCUMENTS

| 142568 | 4/1961 | U.S.S.R. | 406/88 |
| 9010587 | 9/1990 | WIPO | 406/88 |

*Primary Examiner*—Gary C. Hoge
*Attorney, Agent, or Firm*—St. Onge Steward Johnston & Reens

[57] ABSTRACT

A neck guide air conveyor having passageways formed above the support structure for the neck guides to direct pressurized air over the collars of articles to propel the articles. The passageways are connected to a source of pressurized air and direct the pressurized air at an inclined and downstream angle over the collars of the articles from a point above the support structure for the neck guides. The passageways may be partially formed of a plurality of channels integrally molded in the support structure for the neck guides. The passageways may also be partially formed by a spacer having a plurality of slots open toward the articles where the spacer is placed above and adjacent the support structure for the neck guides.

9 Claims, 6 Drawing Sheets

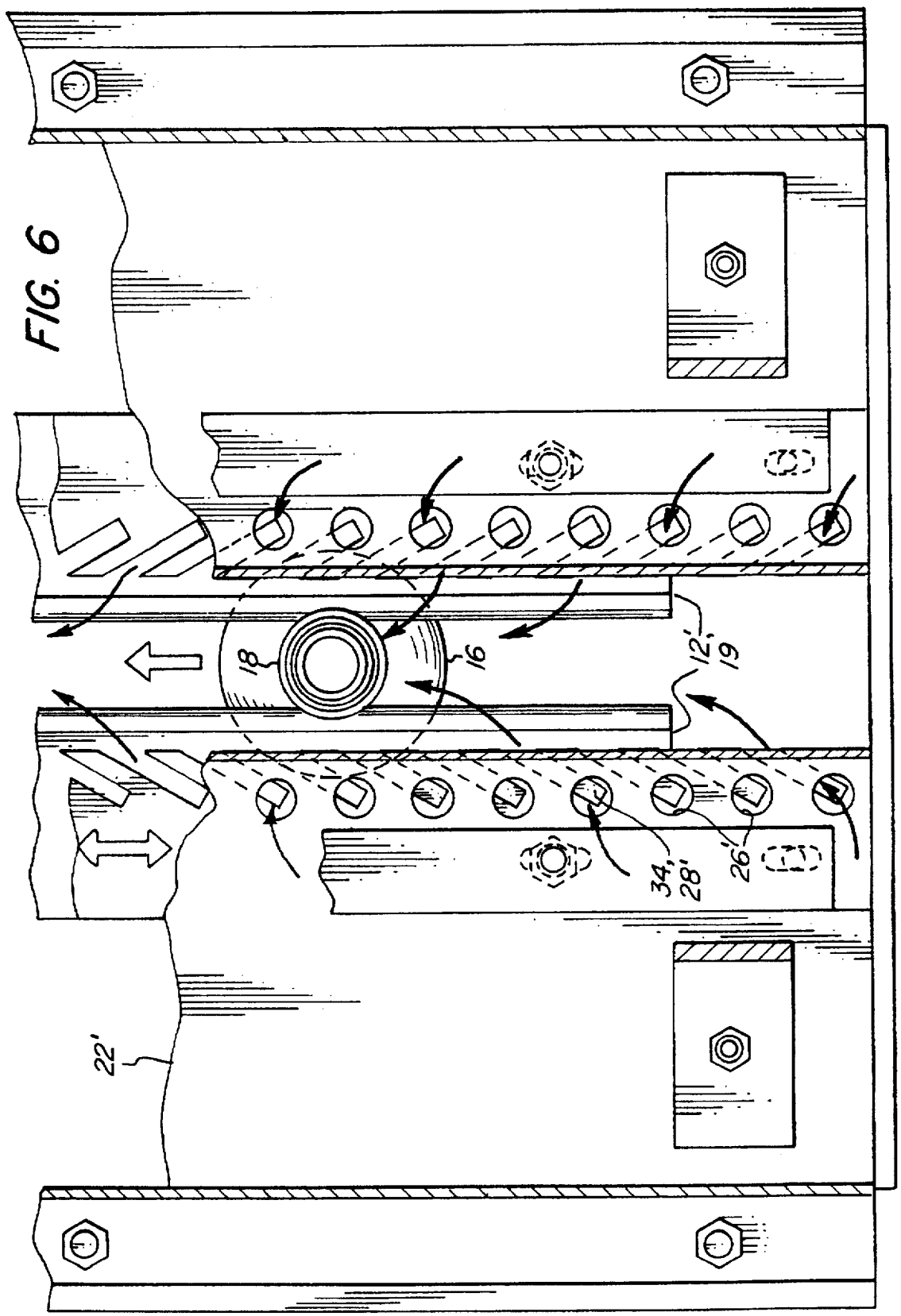

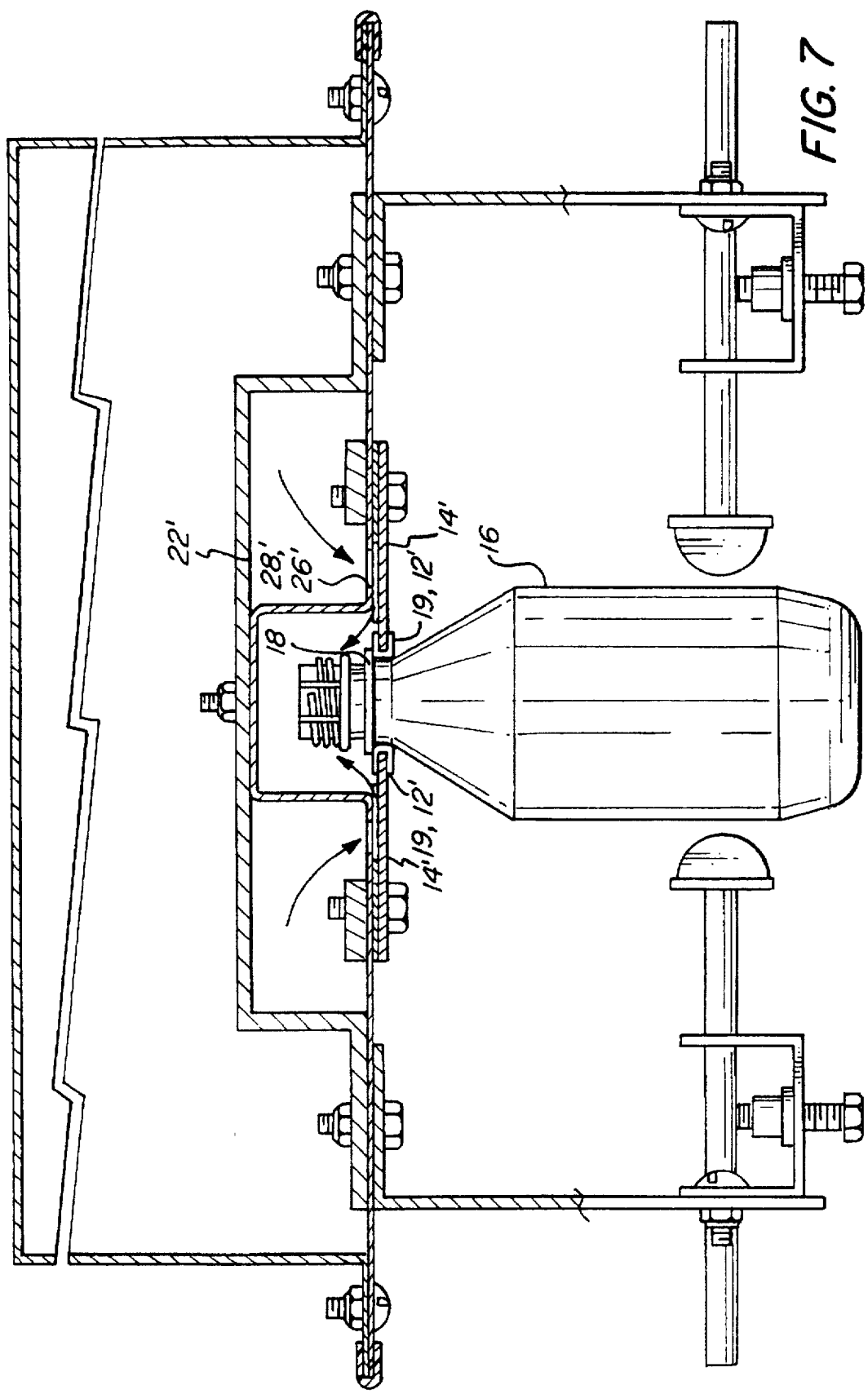

1

THRUST SLOT NECK-GUIDED AIR CONVEYOR

FIELD OF THE INVENTION

The invention relates to air conveyors and, in particular to air conveyors for bottles.

BACKGROUND OF THE INVENTION

In air conveyor systems for bottles, the bottles are commonly transported by the neck areas or by collars/rings around the neck areas. Also, such articles are commonly moved along the conveying line by jets of pressurized air. Various configurations of neck guides (or collar guides) and pressurized air systems have been attempted in these previous designs.

For example, U.S. Pat. No. 5,161,919 to Smith discloses several bottle conveyors which support bottles by the collar and which include apertures for directing pressurized air at a shoulder region of the bottles. Smith also discloses sloping neck guides to reduce friction with the collars/rings.

U.S. Pat. Nos. 4,283,370 to Danler and 4,822,214 to Aidlin disclose devices in which air is directed onto the necks of bottles from above the neck guides.

Another example is U.S. Pat. No. 5,299,889 to Langenbeck which discloses a neck guide air conveyor which includes apertures below the neck guides which direct air at an upward angle of approximately 45 degrees toward the underside of the collars. This design provides some lift to the bottles in an apparent attempt to reduce the friction between the collars and the neck guides.

Each of these prior designs suffers from a common limitation that the air jet size, spacing, angle and other features are not readily adjustable for maximizing transport efficiency of various size and shape bottles. This deficiency is increasingly critical because it is becoming increasingly important that bottling lines and whole plants be easily and quickly changeable to efficiently handle various size and shape bottles.

What is desired therefore is an air bottle conveyor which is readily adaptable to different types and sizes of bottles for meeting the rapid changeover requirements of bottling lines and plants while transporting bottles at maximum efficiency.

SUMMARY OF THE INVENTION

Accordingly, it is an object of the invention to provide a neck guide conveyor employing pressurized air to simultaneously propel and lift the articles.

A further object is to provide an air conveyor of the above character wherein the means to direct the pressurized air is removable and replaceable so as to enable the conveyor to be adapted to different articles and uses.

Another object is to provide a neck guide air conveyor of the above character wherein the pressurized air is directed by passageways formed by channels integrally molded in the support structure for the neck guides.

Yet a further object is to provide a neck guide air conveyor of the above character wherein the pressurized air is directed by slots in a slotted spacer placed between the support structure for the neck guides and the source of pressurized air.

These and other objects are realized by the present air conveyor which includes passageways formed between the support structure for the neck guides and a source of pressurized air. The passageways are connected to the source of pressurized air and direct the pressurized air at an inclined and downstream angle over the collars of the articles to propel the articles. In one embodiment, channels integrally molded in the support structure for the neck guides form part of the passageway. The channels are connected to a source of pressurized air by air ducts which form another portion of the passageway. In another embodiment, the passageways are formed by a substantially planar support structure for the neck guides, a source of pressurized air, and a slotted spacer placed therebetween.

The invention and its particular features and advantages will become more apparent from the following detailed description considered with reference to the accompanying drawings.

BRIEF DESCRIPTION OF THE DRAWINGS

FIG. 6 is a top-view of the embodiment of FIG. 5 showing the holes which communicate with the slots in the spacer and showing the downstream direction of the slots.

FIG. 7 is a side-view of the embodiment of FIG. 5.

DETAILED DESCRIPTION OF THE INVENTION

Figure 1:
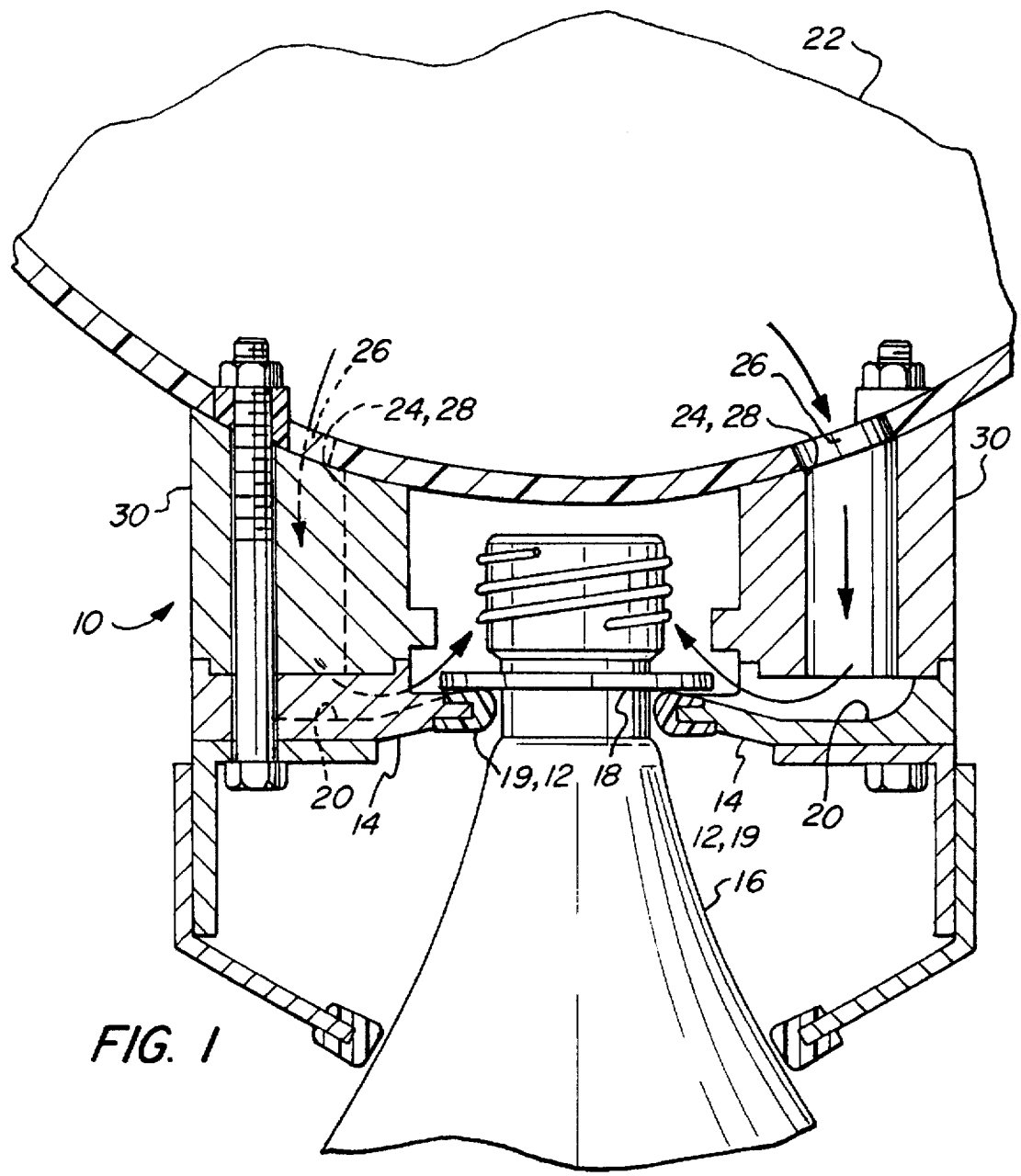
FIG. 1 is an end-view of the preferred embodiment of an air conveyor in accordance with the invention showing the flow of pressurized air from a plenum, through the air ducts and passageways and over the collar of an article.
Figure 2:
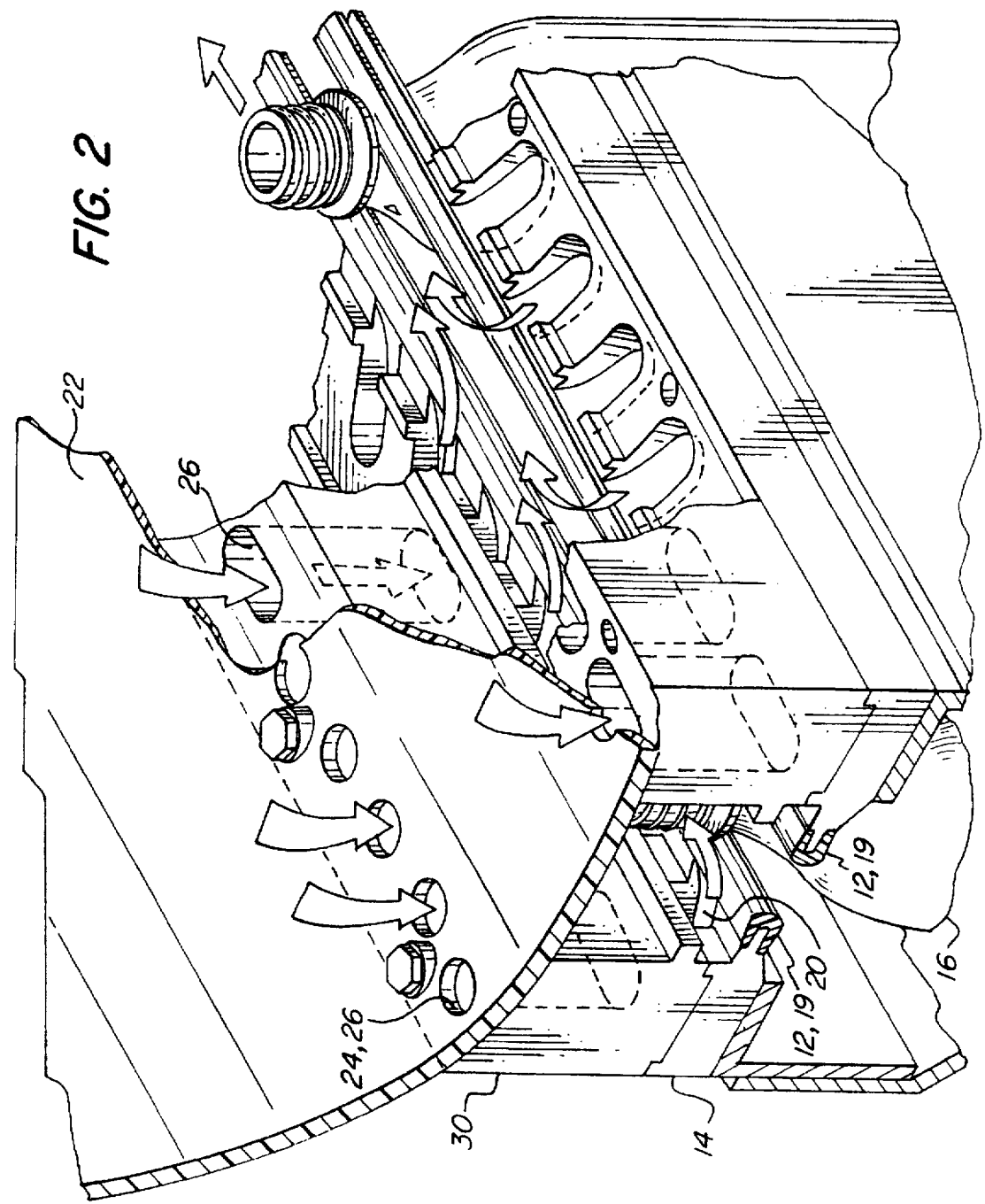
FIG. 2 is a cut-away, isometric view of the air conveyor of FIG. 1 showing the passageways formed by the plenum holes, the air ducts and the integrally-formed channels.

Referring to FIGS. 1 and 2, the preferred embodiment of a neck guide air conveyor 10 in accordance with the invention includes opposed neck guides 12 with support structure 14 therefore. The transported article 16 (such as the bottle depicted) includes a collar 18 around the neck area which interfaces with neck guides 12. Preferably, collar 18 extends beyond neck guides 12 and overhangs neck guides 12 such that a portion of the bottom surface of collar 18 is exposed. Neck guides 12 may include wear strips 19 or the like attached thereto.

The support structure 14 for neck guides 12 preferably includes integrally-molded channels 20 for directing pressurized air toward article 16. By "integrally-molded" is meant that support structure 14 and channels 20 are both formed in a single piece of material. The pressurized air is directed over the collar 18 of the article to provide lift at an inclined angle thereby providing enhanced lift to article 16. Also, the channels 20 are pointed downstream to propel the articles.

Channels 20 are connected to a source of pressurized air 22 (or a plenum 22) by an array of air ducts 24 via holes 26 in plenum 22. The assembly forms passageways 28 to direct the pressurized air toward article 16. Support structure 14 forms the lower surface of passageways 28 and the structure 30 for air ducts 24 forms the upper surface for passageways 28.

The pressurized air flows from plenum 22 (such as the PVC pipe depicted), through air ducts 24, through the passageways 28, and over the collar 18 of article 16. Portions of passageways 28 are below collar 18 of the article, thus the air streams emerging therefrom have an upward component to enhance lift.

It should be appreciated that neck guide air conveyor 10 may be readily adapted to different articles by changing neck guides 12 along with the support structure therewith and/or air ducts 24.

Figure 4:
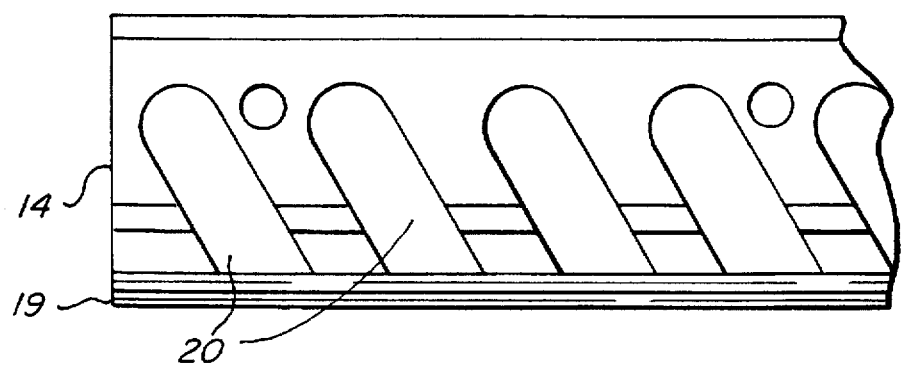
FIG. 4 is a top view of the neck guides and support structure of FIG. 3 showing the downstream direction of the channels.
Figure 3:
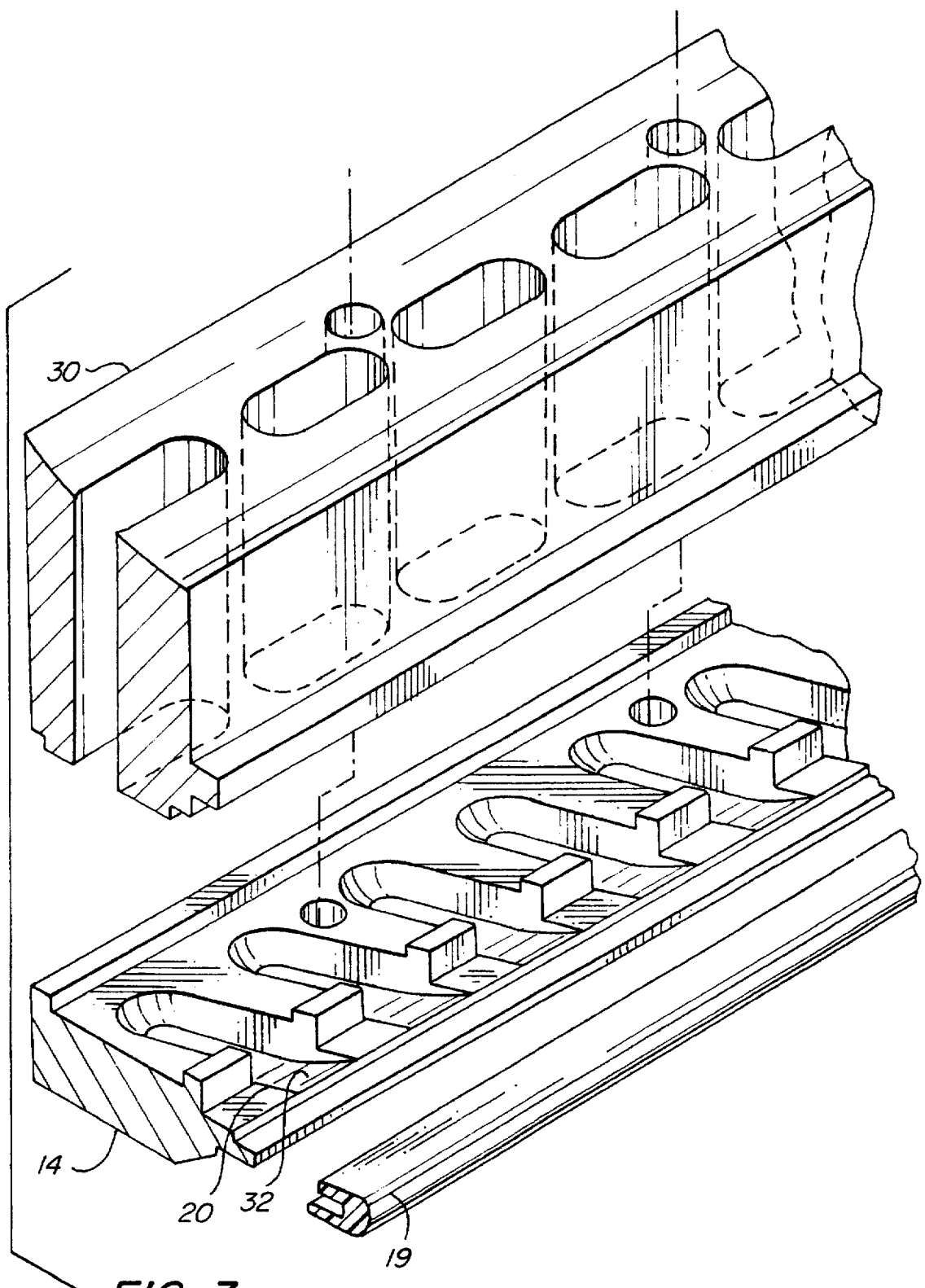
FIG. 3 is an exploded view of the air duct and neck guide support structure of FIG. 1 showing the channels integrally formed in the support structure for the neck guides.

Referring to FIGS. 3 and 4, channels 20 formed in the support structure 14 for neck guides 12 include a lip 32 to direct the pressurized air over collar 18 of the article. As mentioned above, structure 30 for air ducts 24 form a portion of passageway 28 for the pressurized air when air ducts 24 and support structure 14 for neck guides 12 are assembled. Also, channels 20 are angled downstream with respect to the conveying line to propel articles 16.

Figure 5:
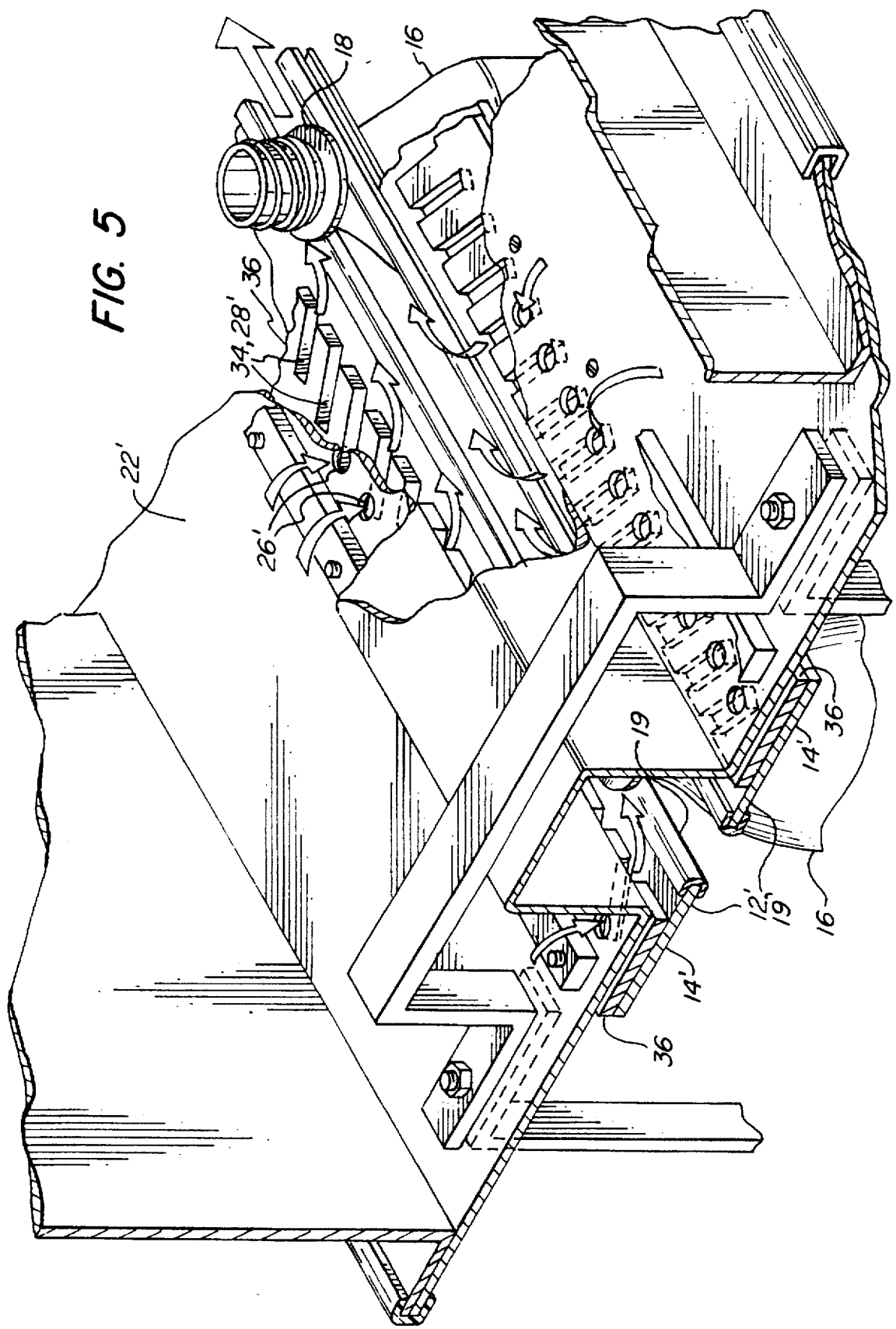
FIG. 5 is an isometric view of another embodiment of the conveyor of FIG. 1 in accordance with the invention showing a removable spacer with slots forming passageways for directing pressurized air.

Referring to FIG. 5, another embodiment of the invention includes opposed neck guides 12' with support structure 14'. As is depicted, neck guide 12' may comprise wear strips 19' attached thereto. The transported article 16 includes a collar 18 around the neck area which interfaces with neck guides 12'. A plenum 22' includes holes 26' which are aligned with slots 34 in a spacer 36 placed between support structure 14' and plenum 22'. Slots 34 have a closed end adjacent the holes 26' and are open toward neck guides 12'. Thus, slots 34, support structure 14' and plenum 22' form passageways 28' to direct the pressurized air toward the article 16.

Referring to FIG. 6, holes 26' are aligned adjacent the closed end of slots 34 and the slots 34 are angled downstream to propel the article 16.

Referring to FIG. 7, the pressurized air flows from plenum 22', through holes 26' therein, through passageways 28', over neck guides 12' and over collar 18 of article 16. As depicted here, collar 18 of article 16 does not extend over neck guide 12' as in the preferred embodiment described above, however, the extension of collar 18 over neck guides 12' is not necessary for the function of the air conveyor. Also, support structure 14' for neck guides 12' may be substantially planar as shown.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An air conveyor for articles with collars, comprising:
   removable, opposed neck guides aligned below said collars such that a portion of said collars of said articles extend beyond and overhang said neck guides;
   said neck guides having support structure with channels formed integrally and in one piece therein, ends of said channels being pointed upward and downstream to lift and propel said articles, and a portion of said channels being below tops of said collars;
   a conduit for pressurized air having a plurality of holes;
   air ducts connecting said holes in said conduit to said channels in said support structure;
   said support structure, said channels and said air ducts forming passageways for directing pressurized air from said conduit toward said articles.

2. An air conveyor for articles with collars, comprising:
   removable, opposed neck guides aligned below said collars such that portions of said collars of said articles extend beyond and overhang said neck guides;
   support structure for said neck guides, said support structure forming a substantially planar surface;
   a conduit for pressurized air having a plurality of holes;
   a spacer between said support structure and said conduit, said spacer having a plurality of slots with ends open toward said articles, said holes of said conduit being in an operable relationship with said slots such that said slots, said support structure and said conduit form passageways to direct pressurized air toward said articles; and
   said slots being aligned to direct pressurized air over said collars in a downstream direction to provide lift and propulsion to said articles.

3. An air conveyor for articles with collars, said air conveyor comprising:
   opposed neck guides aligned below said collars;
   support structure for said neck guides;
   a conduit for pressurized air;
   passageways having lower surfaces, said passageways being in fluid communication with said conduit, being open toward said neck guides for directing streams of pressurized air toward said articles in a downstream direction to propel said articles;
   portions of said lower surfaces of said passageways being below tops of said collars and being above a portion of said support structure such that said streams of pressurized air rise over said collars; and
   a spacer between said conduit and said support structure, said spacer having slots with ends open toward said articles, said slots forming portions of said passageways for directing pressurized air toward said articles.

4. The air conveyor of claim 3, wherein said spacer is removable to adapt said conveyor to different articles.

5. The air conveyor of claim 3, wherein said passageways further comprise upper surfaces, wherein said support structure forms said lower surfaces of said passageways, and wherein said conduit forms said upper surfaces of said passageways.

6. The air conveyor of claim 5, wherein portions of said collars of said articles extend beyond and overhang said neck guides to enhance the lift provided to said articles.

7. An air conveyor for articles with collars, said air conveyor comprising:
   opposed neck guides aligned below said collars;
   support structure for said neck guides;
   a conduit for pressurized air;
   passageways having upper and lower surfaces, said passageways being in fluid communication with said conduit, being open toward said neck guides for directing streams of pressurized air toward said articles in a downstream direction to propel said articles;
   said passageways further including channels formed integrally and in one piece with said support structure;
   portions of said lower surfaces of said passageways being below tops of said collars and being above a portion of said support structure such that said streams of pressurized air rise over said collars; and
   a block of air ducts connecting said passageways to said conduit, said block forming said upper surfaces of said passageways, and wherein said support structure forms said lower surfaces of said passageways.

8. An air conveyor for articles with collars, said air conveyor comprising:
   opposed neck guides aligned below said collars;

support structure for said neck guides;

a conduit for pressurized air;

passageways having lower surfaces, said passageways being in fluid communication with said conduit, being open toward said neck guides for directing streams of pressurized air toward said articles in a downstream direction to propel said articles;

said passageways further including channels formed integrally and in one piece with said support structure, said channels having open ends wherein lower surfaces of said channels adjacent said open ends are inclined to direct pressurized air at an upward angle to provide a lifting force to said articles;

portions of said lower surfaces of said passageways being below tops of said collars and being above a portion of said support structure such that said streams of pressurized air rise over said collars; and portions of said collars of said articles extending beyond and overhanging said neck guides to enhance the lift provided to said articles.

9. The air conveyor of claim 8, wherein said support structure is removable to allow the conveyor to be adapted to different articles.

* * * * *